United States Patent [19]

Sublett et al.

[11] Patent Number: 5,559,159
[45] Date of Patent: Sep. 24, 1996

[54] PROCESS INCLUDING DEPOLYMERIZATION IN POLYESTER REACTOR FOR RECYCLING POLYESTER MATERIALS

[75] Inventors: Bobby J. Sublett, Kingsport; Gary W. Connell, Church Hill, both of Tenn.

[73] Assignee: Eastman Chemical Company, Kingsport, Tenn.

[21] Appl. No.: 570,175

[22] Filed: Dec. 7, 1995

[51] Int. Cl.$^6$ .................................................. C08J 11/04
[52] U.S. Cl. .................................................. 521/48.5
[58] Field of Search .................................................. 521/48.5

[56] References Cited

U.S. PATENT DOCUMENTS

| | | |
|---|---|---|
| 3,703,488 | 11/1972 | Morton . |
| 3,884,850 | 5/1975 | Ostrowski . |
| 4,259,478 | 3/1981 | Jackson, Jr. et al. ............... 521/48.5 |
| 4,539,341 | 9/1985 | Hallmark et al. ............... 521/48.5 |
| 4,609,680 | 9/1986 | Fujita et al. . |
| 4,873,268 | 10/1989 | Hallmark et al. ............... 521/48.5 |
| 5,223,544 | 6/1993 | Burkett et al. . |
| 5,298,530 | 3/1994 | Gamble et al. ............... 521/48.5 |

OTHER PUBLICATIONS

Incorporating Postconsumer Recycled Poly(ethylene terephthalate), Richard et al., ACS Symposium Series, 513, 196 (1992).

Primary Examiner—Morton Foelak
Attorney, Agent, or Firm—Charles R. Martin; Harry J. Gwinnell

[57] ABSTRACT

Previously used poly(ethylene terephthalate) polyester materials and copolymers thereof, and in particular postconsumer polyester materials, are depolymerized and repolymerized to produce bottle grade polymer containing up to 75% of the previously used material. The process involves the solubilization and depolymerization of the previously used polyester material in a transesterification and/or polymerization mixture containing dimethylterephthalate, ethylene glycol and transesterification products thereof.

20 Claims, No Drawings

PROCESS INCLUDING DEPOLYMERIZATION IN POLYESTER REACTOR FOR RECYCLING POLYESTER MATERIALS

FIELD OF THE INVENTION

The present invention relates to the field of recycling and regenerating previously used polyester materials. In particular the invention provides a process whereby previously used polyester materials, including either or both of scrap polyester materials and postconsumer polyester materials, may be conveniently and efficiently recycled using a process whereby the previously used materials are fed into the reactor where a step in the production of new polyester product is ongoing. More particularly the invention is directed to a novel process including the simultaneous depolymerization of previously used materials and the transesterification of new materials in a single polyester reaction step for recycling polyester materials. Even more particularly the present invention involves the introduction of a previously used polyester material into a process where a diol and a dicarboxylic acid are undergoing transesterification whereby the previously used polyester material is subjected to depolymerization by glycolysis at the same time that the new materials are transesterified.

BACKGROUND OF THE INVENTION

In the contemporary environment of the present time, it is becoming increasingly more important to recycle plastics, including particularly poly(ethylene terephthalate) (hereinafter referred to as "PET") which is used in volumes of billions of pounds per year, mainly to package carbonated drinks. Concern for the environment has led to a demand for packaging materials that are at least partially composed of postconsumer polyester materials. As a result, postconsumer polyester materials are now being widely recycled. For instance, carbonated beverage bottles made of PET may be recycled into new PET beverage bottles.

Due to problems with overloaded landfills, several states have passed laws requiring certain percentages of new PET soft drink bottles to be made from clean postconsumer polyester material generated from previously used PET beverage bottles. In the past few years the number of bottle deposits and curbside recycling programs has increased tremendously and such activities are providing a source of postconsumer packaging materials including bottles for carbonated beverage made from PET. The collection of PET bottles and food trays through recycling programs has resulted in a source of postconsumer PET which has been used for a number of applications.

Generally speaking, these known applications have involved the conversion and fabrication of the postconsumer PET into materials of lower value. Examples of such applications are polyols for unsaturated polyesters or polyurethanes, fiberfill, carpet fibers, and strapping. Recycled PET is also blended with other materials such as poly(butylene terephthalate) or polycarbonate, for automotive as well as other engineering applications.

These known procedures all require a myriad of expensive processes to accomplish the desired blending of old and new materials, and all have shortcomings which limit their adaptability for use in the production of the high grade materials needed for packaging ingestible products. Known procedures for depolymerizing PET for reuse in the manufacture of new PET are described, for example, in U.S. Pat. Nos. 3,703,488, 3,884,850 and 5,223,544.

Presently, it has become commercially desirable to use previously used, particularly postconsumer PET in the synthesis of new PET for making carbonated beverage bottles. Several chemical treatment techniques are known for facilitating the regeneration and recycling of previously used polyester material. Such techniques are employed to depolymerize polyester material to be recycled, whereby the polyester material is reduced to monomeric and/or oligomeric components. The monomeric and/or oligomeric components may then be repolymerized to produce recycled polyester material. Such techniques may be used to facilitate the recycling of PET; however, it should be apparent to the routineer in the related arts that these same techniques are applicable to other polyester materials which are desirably to be recycled.

One known technique is to subject PET to methanolysis. In accordance with the methanolysis approach, PET is reacted with methanol to produce dimethyl terephthalate (DMT) and ethylene glycol (EG). The DMT and EG may be readily purified and thereafter used to produce PET containing recycled polyester material. However, most conventional commercial PET production facilities throughout the world are designed to use either terephthalic acid (TPA) or DMT, but not both, as the monomeric raw material. Thus, additional processing is generally required to convert the DMT into the TPA needed as a raw material for many such facilities.

Another known technique is hydrolysis, whereby PET is reacted with water to depolymerize the PET into TPA and EG. However, it is known that certain types of contaminants generally present in recycled PET are very difficult and expensive to remove from TPA. Moreover, for those facilities designed to use DMT as a raw material, the TPA must be converted into DMT.

Glycolysis may also be used for depolymerizing PET. Glycolysis occurs when PET is reacted with EG, thus producing bis-(2-hydroxyethyl) terephthalate (BHET) and/or its oligomers. Glycolysis has some significant advantages over either methanolysis or hydrolysis, primarily because BHET may be used as a raw material for either a DMT-based or a TPA-based PET production process without major modification of the production facility. Another significant advantage provided by the glycolysis technique is that the removal of glycol from the depolymerization solvent is not necessary. In this connection it is to be noted that the co-produced glycol must be quickly separated from the water in the hydrolysis process and from the methanol in the methanolysis process to avoid immediate repolymerization.

The glycolysis approach is not without its own problems. These problems are discussed by Richard et al., for example, in their article entitled *Incorporating Postconsumer Recycled Poly(ethylene terephthalate)* which appeared in ACS Symposium Series, 513, 196 (1992).

A shortcoming of the previous glycolysis technique, as well as of all of the other known techniques described above, however, is that additional processing steps, as well as the concomitant additional capital expenditures, are required.

Previously known glycolysis processes include the independent complete glycolysis of postconsumer PET and the subsequent addition of some portion of the glycolysis product to a polycondensation process. Such processes require more than normal pressure and a large excess of ethylene glycol. These requirements reduce the reactor efficiency by decreasing the potential production capacity of the reactor.

Such a process is described in U.S. Pat. No. 5,223,544. Thus, it has previously been known that polyester molecules may be depolymerized by glycolysis. However, in the past it has been found that high temperatures and large excesses of EG are required to solubilize the polyester molecule so that it can then be broken down into its constituent parts such as BHET and oligomers thereof. The high temperatures and excessive EG results in the production of large quantities of diethylene glycol as a by-product. The diethylene glycol thus produced can not be readily removed from the BHET and so, if the BHET is then used to produce regenerated PET, the resultant PET product has a diethylene glycol content that is excessive causing the polymer to be unacceptable for many commercial uses.

Other known processes involving glycolysis require the retention in the reactor of a heel of BHET oligomer having a degree of polymerization greater than 10 at the end of a reaction run in order to solubilize the postconsumer PET because the latter is insoluble in most solvents. These procedures are described in U.S. Pat. No. 4,609,680.

Thus, there clearly remains a need in the art for a glycolysis process that can efficiently handle previously used PET in the manufacture of new packaging grade PET.

SUMMARY OF THE INVENTION

The present invention provides a solution to the prior art problems discussed above. In particular, the invention provides an efficient and economical procedure for utilizing previously used PET in package grade polyester products. In accordance with the invention, a process is provided for preparing a polyester product from a polyester material to be recycled. The process comprises preparing a first reaction mixture including (1) a polyester material to be recycled, (2) a diol and (3) a first dicarboxylic or dicarboxylate species effective for transesterification with the diol to produce a second diester species which is effective for polycondensation to produce a polyester product. The first reaction mixture is subjected to conditions effective for causing transesterification of the diol and the first species to thereby produce the second species and simultaneously cause depolymerization of the polyester material to be recycled to thereby produce a regenerated species which is also effective for polycondensation to produce a polyester product. Thus, a second reaction mixture which contains both the second species and the regenerated species is produced. The second reaction mixture is then subjected to conditions effective for causing polycondensation of the second species and the regenerated species. Thus, a polyester product which contains units of both the second species and the regenerated species is produced. The polyester product containing the previously used polyester is then recovered from the reaction mixture.

In accordance with the invention, the preferred polyester product and the previously used polyester material each comprises a poly(ethylene terephthalate) material, the preferred diol comprises ethylene glycol, and the preferred first species comprises dimethyl terephthalate.

Ideally, the first species comprises dimethyl terephthalate and both the regenerated species and the second species comprise either monomeric or oligomeric bis-(2-hydroxyethyl) terephthalate or a mixture of monomeric and oligomeric bis-(2-hydroxyethyl) terephthalates.

In one form of the invention, the polyester product may be admixed with a virgin polyester product and further processed to produce a blended polyester product.

In another form of the invention, the polyester product is reintroduced into a transesterification stage containing further quantities of diol and first species and subjected to further depolymerization while the further quantities of the diol and the first species simultaneously undergo transesterification.

In the ultimate form of the invention, the polyester product containing previously used polywester is employed to form carbonated beverage containers. In particular, in the ideal polyester product, the same may include polyester molecules made up of a series of terephthalate moieties, about 25 to about 75 molar % of which terephthalate moieties have originated in the regenerated species and from about 75 to about 25 molar % of which terephthalate moieties have originated in the first species.

In yet another form of the invention, the first and second reaction mixtures are reacted in separate, respective reactors.

In accordance with the invention, the process may provide a new polyester product which contains both ethylene glycol and 1,4-cyclohexanedimethanol diol units and such 1,4-cyclohexanedimethanol units may comprise up to about 5 molar % of the total of the diol units. In accordance with this aspect of the invention, the 1,4-cyclohexanedimethanol units may originate either as a part of the diol in the first reaction mixture or as a part of the polyester material to be recycled.

In further accordance with the invention, a process may be provided wherein the new polyester product contains both isophthalic and terephthalic acid units, with the isophthalic units comprising up to about 5 molar % of the total of the acid units. In this case, the isophthalic units may originate either as a part of the first species in the first reaction mixture or as a part of the polyester material to be recycled.

In yet a further aspect of the invention, a process may be provided, wherein the new polyester product contains both 2,6-napthalenedicarboxylic and terephthalic acid units, with the 2,6-napthalenedicarboxylic units comprising up to about 5 molar % of the total of the acid units. In this case, the 2,6-napthalenedicarboxylic units may originate either as a part of the first species in the first reaction mixture or as a part of the polyester material to be recycled.

In a particularly preferred embodiment of the invention for commercial purposes, a process is provided for preparing a new polyester product wherein up to about 75 molar % postconsumer poly(ethylene terephthalate) flake material to be recycled and which consists essentially of ground used soft drink bottle polyester material is used as a feed material. In accordance with this embodiment of the invention, the process comprises preparing a first reaction mixture including (1) the postconsumer poly(ethylene terephthalate) flake material, (2) an ethylene glycol component and (3) a dimethyl terephthalate component. The first reaction mixture is then subjected to conditions effective for causing transesterification of the ethylene glycol component and the dimethyl terephthalate component to thereby produce a first species comprising either monomeric or oligomeric bis-(2-hydroxyethyl) terephthalate or a mixture of monomeric and oligomeric bis-(2-hydroxyethyl) terephthalates and simultaneously causing depolymerization of the postconsumer poly(ethylene terephthalate) flake material to thereby produce a regenerated species also comprising either monomeric or oligomeric bis-(2-hydroxyethyl) terephthalate or a mixture of monomeric and oligomeric bis-(2-hydroxyethyl) terephthalates. Thus, a second reaction mixture containing both the first species and the regenerated species is produced. This second reaction mixture is then subjected to conditions effective for causing polycondensation of the first species and the regenerated species, whereby to produce a new polyester product which contains terephthalate units of both the first species and the regenerated species. In accordance with this aspect of the invention, the relative quantities of the postconsumer poly(ethylene terephthalate) flake material and the dimethyl terephthalate charged as reactants into the process is such that the total of the terephthalate units in the new polyester product comprises from about 25 to about 75 molar % of units of the regenerated species and from about 75 to about 25 molar % of units of the first species. The new polyester product is then recovered from the second reaction mixture.

In accordance with the foregoing process, the new polyester product may contain both isophthalic and terephthalic acid units, with the isophthalic units comprising up to about 5 molar % of the total of the acid units. In this case, the isophthalic units may originate either as a part of the dimethyl terephthalate component in the first reaction mixture or as a part of the postconsumer poly(ethylene terephthalate) flake material.

In further accordance with the foregoing process, the new polyester product may contain both 2,6-napthalenedicarboxylic and terephthalic acid units, with the 2,6-napthalenedicarboxylic units comprising up to about 5 molar % of the total of the acid units. In this case, the 2,6-napthalenedicarboxylic units may originate either as a part of the dimethyl terephthalate component in the first reaction mixture or as a part of the postconsumer poly(ethylene terephthalate) flake material.

In still further accordance with the foregoing process, the new polyester product may contain both ethylene glycol and 1,4-cyclohexanedimethanol diol units, with the 1,4-cyclohexanedimethanol units comprising up to about 5 molar % of the total of the diol units. In this case, the 1,4-cyclohexanedimethanol units may originate either as a part of ethylene glycol component in the first reaction mixture or as a part of the postconsumer poly(ethylene terephthalate) flake material.

Known processes described above for the utilization of postconsumer PET in carbonated bottles do not suggest the process of the invention and have very acute disadvantages when compared to this process. Thus, it was an unexpected and beneficial windfall when the present inventors determined, in accordance with the present invention, that postconsumer and other previously used polyester materials are soluble and depolymerizable when present in quantities of up to at least about 75 mole % in a transesterification mixture containing DMT and ethylene glycol and transesterification products thereof.

In most known processes, the previously used polyester is subjected to complete glycolysis, and the completely glycolyzed material is then fed into a polycondensation reactor. The process of the invention, however, has the advantage of not generating large quantities of diethylene glycol, a by-product that is generated when total glycolysis processes are used due to the excessive amounts of ethylene glycol and high temperatures necessary to solubilize the previously used polymeric polyester materials.

DESCRIPTION OF THE PREFERRED EMBODIMENTS OF THE INVENTION

In a known process for the production of a PET, DMT is reacted with an excess of EG in a first stage to produce BHET by a transesterification mechanism. The BHET thus produced is thereafter subjected to polycondensation in a second stage to produce PET. Of course, as would readily be apparent to the routineer in this art, this same mechanism is available for producing polyesters generally from diols and dicarboxylic acids and/or simple esters of the latter. The invention of the present application involves the step of charging previously used, for example, postconsumer, PET material, which may be in the form of flakes, for example, into a transesterification reactor containing a PET or PET copolymer reaction mix comprising DMT and EG. The postconsumer PET can be included at a concentration of up to about 75 mole % of the total charge of reactants. That is to say, the postconsumer PET provides up to 75% of the total number of terephthalic moieties in the mix with the remainder of such moieties being provided by the new DMT. The mixture may then be heated at a temperature sufficient to effect simultaneous transesterification of DMT with EG and depolymerization of previously used PET by glycolysis. As the process proceeds, certain low density impurities that might be in the postconsumer material are floated and skimmed off the top of the reaction mix by a vacuum siphon that removes any floatation material from the reaction, whether it is conducted in a batch reactor or in a laboratory flask. Materials from the postconsumer fraction that are denser than the reaction mix, such as dirt, metals, etc., will sink to the bottom of the reactor. At the completion of the transesterification stage, the reaction mix may be siphoned off and supplied to a second (polycondensation) reactor leaving the high density materials either deposited at the bottom of the reactor or retained on a filter located between the transesterification reactor and the polycondensation reactor. This procedure has the dual advantages of utilizing the full capacity of the reactor and diminishing the need for dilution of the reaction mix with a large excess of ethylene glycol to effect either glycolysis or depolymerization. A small amount of transesterification catalyst may be added to the reaction mix in a concentration necessary to effect transesterification with the concentration of dimethyl terephthalate present in the charge.

After transesterification and depolymerization are complete, the floatation material is siphoned off with a vacuum skimmer and the low viscosity BHET and oligomers thereof are pumped through a filter to a second reactor where polycondensation is executed without the addition of polycondensation catalyst until the BHET and/or oligomers thereof are polycondensed to an inherent viscosity (I.V.) of 0.36. The polycondensate product may then be cast on a cooling belt, cooled, partially crystallized, broken into chunks using a mechanical beaker, and then ground into a powder with a particle size sufficient for fluidizing. The 0.36 I.V. powder may then either be fluidized to an I.V. in the range of bottle polymer polyester (0.70 to 0.90) or fed to a TPA based continuous polyester reactor train by being mixed in quantities up to 75% of the TPA in the slurry feed, that is replacing up to 75 mole % of the TPA in the TPA slurry feed of a continuous reactor. The continuous reactor is used to polycondense the mixture to an I.V. in the proximity of about 0.65 to 0.68 I.V.

The polymer is extruded to pellets and subjected to solid stating to a bottle polymer I.V. in the range of about 0.70 to 0.90, depending on the intended application for the polymer. The pellets from the solid stating process have excellent whiteness and are identical in appearance with any commercial bottle grade polymer polyester manufactured for use in carbonated beverage bottles which do not contain any postconsumer polyester. The process described above may be used to cause ester interchange, whereby to transesterify DMT. The process is not restricted to any catalyst, and any single known transesterification catalyst will suffice, including soluble salts of titanium, manganese, zinc, calcium, and combinations thereof.

In cases where large amounts of acid producing material are present in the postconsumer material, a buffer may be employed in the simultaneous transesterification/depolymerization step. Buffers that are known to work, such as sodium acetate, potassium carbonate or any salt of a strong base and weak acid, may be employed to suppress the formation of diethylene glycol to a useful level. It may not be necessary to use a buffer, but the option is available. The postconsumer flake or pellets may also contain small amounts of a second acid or glycol such as isophthalic acid, 1,4-cyclohexanedimethanol. Such acids or glycols may also be intentionally added to the transesterification/depolymerization mix if so desired. Bottles blown from a polymer containing 25 to 75 wt % or more of postconsumer PET prepared via the process described above have excellent characteristics with respect to clarity, color, oxygen, carbon dioxide barrier, and processability and are virtually indistinguishable from carbonated beverage bottles produced from virgin PET or a PET copolymer.

Rather than produce a 0.36 I.V. powder to be mixed and used as part of a feed for a TPA process, the transesterification product can be melt polymerized to an I.V. of 0.5 to 0.70, pelletized and blended with virgin PET pellets to any percentage necessary to produce a product containing 25% or more previously used polyester material in the finished polymer. The mixture of pellets may then be solid stated to a bottle polymer I.V. of 0.72 to 0.90. The preferred method of using postconsumer polyester flake to achieve a beverage bottle polymer containing at least 25% postconsumer material is to depolymerize postconsumer scrap by feeding dimethyl terephthalate, ethylene glycol and up to 75 mole % postconsumer flake to a transesterification reactor, and conducting transesterification and depolymerization reactions simultaneously in the same reactor mix. The product from the transesterification/depolymerization reaction is then fed to a batch or continuous unit in an amount necessary to give at least 25% postconsumer PET in the mix with virgin prepolymer. The mix is melt polymerized to 0.50 to 0.68 I.V., and then pelletized. The pellets are solid state polymerized to a bottle polymer I.V. of 0.70 to 0.90. Clean postconsumer bottle polymer flake suitable for use in the foregoing process may be obtained from Puretech, Springfield, Mass., or St. Jude Polymers in Frackville, Pa.

Another aspect of this invention includes a different method of finishing the precursor materials to a polyester after glycolysis. This part of the process includes charging DMT, EG and transesterification catalyst into a reactor in which the DMT will comprise 25 to 75 mole % of the terephthalic moieties in the polymer to be produced. The remainder of the charge will be 75 to 25 mole % of cleaned postconsumer flake bottle recycle material which consists of high molecular weight (I.V. greater than 0.60) of bottle scrap of PET and/or PET copolymer. The PET may contain small amounts (about 3 mole %) of isophthalic acid, 2,6-napthalenedicarboxylic acid, or 1,4-cyclohexanedimethanol which may be copolymerized with the PET. A typical polyester process may be conducted with a reactor charge of 25 to 75 mole % DMT, EG and 25 to 75 mole % of clean postconsumer bottle flake. The process involves a first step comprising simultaneous depolymerization and transesterification followed by a second polycondensation step.

EXAMPLES

Example 1

72.75 grams (0.375 moles) of DMT, 93 grams (1.5 moles) of EG, 1 ml of an EG solution containing 1.588 grams of zinc acetate dihydrate catalyst per 100 ml of EG, and 2 ml of an EG solution containing 2.18 grams of antimony trioxide catalyst per 200 ml of EG are mixed together in a 500 ml 3-necked round bottom flask equipped with a ground glass head, a stirrer, and a nitrogen inlet. 72 grams (0.375 moles) of commercial postconsumer PET polyester flake produced by cleaning and grinding PET soft drink bottles is added to the reaction admixture in the flask. The postconsumer PET flake has an I.V. of 0.70. The flask is then immersed in a Belmont metal bath and heated for about 1 hour at 200° C. and about 2 hours at 210° C. After this time the theoretical amount of methanol has been collected and the transesterification stage is completed. At this time the mixture is a clear transparent solution. While keeping a head of nitrogen over the molten solution, a ground glass plug is removed from one of the flask necks and a glass siphon tube with a vacuum use is introduced through the open neck and any material floating on the polymer solution is siphoned off. A small amount off the top of the solution may also be siphoned with the vacuum, if deemed necessary. The contents of the flask may then be transferred by pouring or pumping into a second polycondensation reaction flask equipped the same way as the transesterification flask. The molten liquid is at a temperature of 210° C. and the same is passed through a very fine screen to remove any dense material that might have settled to the bottom of the transesterification flask. The polycondensation flask is immersed in a Belmont metal bath that has been preheated to 210° C. The temperature of the flask is increased to 280° C. and the pressure in the flask is reduced to 0.1 to 0.5 mm of Hg. The temperature is maintained at 280° C. and the pressure is maintained between 0.1 to 0.5 mm for 20 min. The vacuum is then discontinued and nitrogen is bled into the flask. The flask containing the molten polymer is disconnected from the polymer rig, and while holding the clamp attached to the flask, the molten polymer is poured into a two liter stainless steel beaker containing ice water. The water is continuously stirred while the molten polymer is being quenched so as to form a continuous rod. The amorphous rod has an inherent viscosity of 0.36. The rod is ground to pass a 3 millimeter screen and the ground powder is placed in a stainless steel tray and heated at 180° C. until it is crystallized. This low I.V. (0.36) crystalline polymer is ground to a fine particle size then mixed with ground virgin 0.36 I.V. PET in a ratio to give 25% or greater residue from the postconsumer flake in the polymer blend. The blend is then subjected to solid-state polymerization in a fluidized bed until the I.V. is 0.76. The 0.76 I.V. polymer thus produced has the following characteristics (as measured by a Hunter instrument system: reflectance L (reflectance)=83.00, a (red coloration)=0.77, b (yellow coloration)=1.50. Also, the produced polymer has a diethylene glycol content of 2.44 mole %.

Example 2

PET with an I.V. of 0.36 is produced from postconsumer PET flake as in Example 1. Such polymer is ground into a powder and the powder is fed into a melt phase transesterification reaction mix in an amount so that the finished polymer contains 25 or more mole % residue of postconsumer flake. The mix is heated at 200° C. for about 1 hour and 210° C. for about 2 hours until the theoretical amount of methanol is evolved signalling the end of the transesterification reaction. The temperature is then increased to 280° C. and as soon as the temperature reaches 280° C. and a clear melt has formed the reaction flask is subjected to a reduced pressure of 0.1 to 0.5 mm of mercury and the melt is heated with stirring for 1 hour. The polymer is removed from the flask and pelletized. The pellets have an I.V. of 0.68. The pellets are crystallized at 180° C. and then subjected to solid state polymerization at 215° C. with a stream of dry nitrogen until the pellets reach an I.V. of 0.76 to 0.90 or whatever the desired I.V. The polymer thus produced has the following characteristics: L=82.00, a=−1.27, b=2.00, and diethylene glycol content=2.10 mole %.

Example 3

109.125 grams (0.5625 moles) of DMT, 93.0 grams (1.5 moles) of EG and 36.0 grams (0.1875 moles) of postconsumer PET flake (obtained from St. Jude Polymer of Frackville, Pa.) are admixed in a 500 milliliter round bottom flask. 3.06 milliliters of a manganese/EG catalyst solution containing a sufficient amount of manganese acetate tetrahydrate to provide 0.0047 gm of manganese metal per milliliter of catalyst solution and 2.64 milliliters of an antimony/EG catalyst solution containing a sufficient amount of antimony trioxide to provide 0.01039 gm of antimony metal per milliliter of catalyst solution are added to the admixture in the flask. The flask is immersed in a metal bath at 200° C., stirred at 200 RPM and held for one hour. The temperature is increased to 210° C. and held for another two hours to complete the transesterification stage. The temperature is then increased to 280° C. and the pressure is reduced from atmospheric to 0.2 mm of mercury over a period of 4 minutes. The speed of stirring is reduced as the viscosity increases until a minimum of 25 RPM is obtained. Polymerization conditions are continued for 75 minutes. The polymer thus produced is allowed to cool and then the polymer is removed from the flask and ground fine enough to pass through a 3 mm screen. The I.V. of the produced PET polymer is 0.73 and the polymer contains 1.74 mole % of diethylene glycol. The polymer, which contains 25 mole % postconsumer PET, has an L color value of 83.16, an a color value of −0.77, and a b color value of 2.12. The polymer is then subjected to solid state polymerization in a fluidized bed reactor at 215° C. for 12 hours with samples taken periodically so as to calculate a polymerization rate. The polymerization rate is 0.032 I.V. units/hr.

Example 4

36.375 grams (0.1875 moles) of DMT, 139.5 grams (2.25 moles) of EG, and 108 grams (0.5625 moles) of postconsumer PET flake (St. Jude Polymer, Frackville, Pa.) are admixed in a 500 milliliter round bottom flask. Then, 0.43 milliliters of a manganese/EG catalyst solution containing a sufficient amount of manganese acetate tetrahydrate to provide 0.0047 gm of manganese metal per milliliter of catalyst solution and 0.87 milliliters of an antimony/EG catalyst solution containing a sufficient amount of antimony trioxide to provide 0.01039 gm of antimony metal per milliliter of catalyst solution are added to the admixture in the flask. The flask is immersed in a metal bath at 200° C., stirred at 200 RPM and held for one hour. The temperature is increased to 210° C. and held for two hours. The temperature is increased to 280° C. and the pressure is reduced from atmospheric to 0.2 mm mercury over a period of 4 minutes. The rate of stirring is reduced as viscosity increases until a minimum speed of 25 RPM is achieved. Condensation polymerization is continued for a period of 75 minutes. The polymer thus produced is allowed to cool and then the same is removed from the flask and ground sufficiently to pass through a 3 mm screen. The I.V. of the polymer is 0.77 and the same contains 2.52 mole % diethylene glycol. The polymer, which contains 25 mole % postconsumer PET, has a L color value of 80.48, an a color value of −1.47, and a b color value of 2.25. The polymer is subjected to solid state polymerization in a fluidized column at 215° C. for 12 hours with samples taken periodically for the purpose of calculating a polymerization rate. The rate is found to be 0.043 I.V. units/hr. The solid state I.V. is 0.81.

Example 5

145.5 grams (0.75 moles) of DMT and 93.0 grams (1.5 moles) of EG are admixed in a 500 milliliter round bottom flask. 0.0314 grams of zinc acetate dihydrate and 3.41 milliliters of an antimony/EG catalyst solution containing a sufficient amount of antimony trioxide to provide 0.01056 gm of antimony metal per milliliter of catalyst solution are added to the admixture in the flask. The flask is immersed in a metal bath at 200° C., stirred at 200 RPM and held for one hour. The temperature is increased to 210° C. and held for two hours. To initiate the polycondensation reaction, the temperature is then increased to 280° C. and the pressure is reduced from atmosphere to 0.2 mm mercury over a period of 4 minutes. Stirring is reduced as viscosity increases until a minimum of 25 RPM is obtained. Condensation polymerization is continued for a period of 75 minutes. The polymer thus produced is allowed to cool and then the same is removed from the flask and ground so as to pass through a 3 mm screen. The I.V. of the polymer is 0.71 and the same contains 2.44 mole % diethylene glycol. The polymer, which contains only virgin PET and was produced for comparison purposes, has an L color value of 86.10, an a color value of −0.40, and a b color value of 2.00. The polymer was subjected to solid state polymerization at 215° C. for 12 hours with samples taken periodically so as to calculate a polymerization rate. The polymerization rate so calculated is 0.024 I.V. units/hr. The final solid state I.V. is 0.77.

Example 6

145.5 grams (0.75 moles) of DMT and 93.0 grams (1.5 moles) of EG are admixed in a 500 milliliter round bottom flask. 1.69 milliliters of a manganese/EG catalyst solution containing a sufficient amount of manganese acetate tetrahydrate to provide 0.0047 gm of manganese metal per milliliter of catalyst solution and 3.41 milliliters of an antimony/EG catalyst solution containing a sufficient amount of antimony trioxide to provide 0.01056 gm of antimony metal per milliliter of catalyst solution are added to the admixture in the flask. The flask is immersed in a metal bath at 200° C., stirred at 200 RPM and held for one hour. The temperature is increased to 210° C. and held for two hours. To initiate the polycondensation reaction, the temperature is then increased to 280° C. and the pressure is reduced from atmospheric to 0.2 mm mercury over a period of 4 minutes. Stirring is reduced as viscosity increases until a minimum of 25 RPM is obtained. Condensation polymerization is continued for a period of 75 minutes. The polymer thus produced is allowed to cool and then the same is removed from the flask and ground so as to pass through a 3 mm screen. The I.V. of the polymer is 0.68 and the same contains 0.99 mole % diethylene glycol. The polymer, which contains only virgin PET and was produced for comparison purposes, has an L color value of 81.65, an a color value of −0.90, and a b color value of 0.01. The polymer was subjected to solid state polymerization at 215° C. for 12 hours with samples taken periodically so as to calculate a polymerization rate. The polymerization rate so calculated is 0,023 I.V. units/hr. The final solid state I.V. is 0.78.

Example 7

36.375 grams (0.1875 moles) of DMT, 139.5 grams (2.25 moles) of EG, and 108 grams (0.5625 moles grams) of postconsumer PET flake (Johnson's Controls) are admixed in a 500 milliliter round bottom flask. 0.0079 grams of zinc acetate dihydrate and 0.78 milliliters of an antimony/EG catalyst solution containing a sufficient amount of antimony trioxide to provide 0.01039 gm of antimony metal per milliliter of catalyst solution are added to the admixture in the flask. The flask is immersed in a metal bath at 200° C., stirred at 200 RPM and held for one hour. The temperature is increased to 210° C. and held for two hours. Polycondensation reaction is initiated by increasing the temperature to 280° C. and the reducing the pressure from atmospheric to 0.2 mm mercury over a period of 4 minutes. Stirring is reduced as viscosity increases until a minimum of 25 RPM is achieved. Polymerization is continued for 75 minutes. The polymer is allowed to cool and then the same is removed from the flask and ground so as to pass through a 3 mm screen. The I.V. of the polymer is 0.54 and the polymer contains 2.64 mole % diethylene glycol. The polymer, which contains 75 mole % postconsumer material, has an L color value of 82.32, an a color value of −1.15, and a b color value of 1.40. The polymer is then subjected to solid state polymerization at 215° C. for 12 hours with samples taken periodically so as to calculate a polymerization rate. The thus calculated rate is 0.019 I.V. units/hr. The final solid state I.V. is 0.76.

Example 8

109.125 grams (0.5625 moles) of DMT, 92.3 grams (1.488 moles) of EG, 1.72 grams (0.012 moles) of cyclohexanedimethanol and 36 grams (0.1875 moles) of postconsumer PET flake (St. Jude Polymer, Frackville, Pa.) are admixed in a 500 milliliter round bottom flask. 1.34 milliliters of a zinc/EG catalyst solution containing a sufficient amount of zinc acetate dihydrate to provide 0.0058 gram of zinc metal per milliliter of catalyst solution, 0.81 milliliters of a cobalt/EG catalyst solution containing a sufficient amount of cobalt acetate tetrahydrate to provide 0.0048 gram of cobalt metal per milliliter of catalyst solution, 2.45 milliliters of an antimony/EG catalyst solution containing a sufficient amount of antimony trioxide to provide 0.01039 gm of antimony metal per milliliter of catalyst solution, and 0.50 milliliters of a phosphorous/EG catalyst solution containing a sufficient amount of phosphorous in the form of a mixed ester of phosphorous to provide 0.97 gram of phosphorous metal per milliliter of catalyst solution are added to the admixture in the flask. The flask is immersed in a metal bath at 200° C., stirred at 200 RPM and held for one hour. The temperature is increased to 210° C. and held for two hours. To initiate polycondensation, the temperature is increased to 280° C. and the pressure is reduced from atmospheric to 0.2 mm mercury over a period of 4 minutes. The rate of stirring is reduced as viscosity increases until a minimum speed of 25 RPM is achieved. Condensation polymerization is continued for a period of 75 minutes. The polymer thus produced is allowed to cool and then the same is removed from the flask and ground sufficiently to pass through a 3 mm screen. The I.V. of the polymer is 0.65 and the same contains 1.58 mole % diethylene glycol. The polymer, which contains 25 mole % postconsumer PET, has a L color value of 83.92, an a color value of 0.06, and a b color value of 0.34. The polymer is subjected to solid state polymerization in a fluidized column at 215° C. for 12 hours with samples taken periodically for the purpose of calculating a polymerization rate. The rate is found to be 0.028 I.V. units/hr. The solid state I.V. is 0.75.

Example 9

(Step 1) A BHET monomer/oligomer mixture containing 75% postconsumer PET constituents is prepared by admixing 36.375 grams (0.1875 moles) of virgin DMT and 139.5 grams (2.25 moles) of EG in a 500 milliliter flask. 1.60 milliliters of a zinc/EG catalyst solution containing a sufficient amount of zinc acetate dihydrate to provide 0.0058 gram of zinc metal per milliliter of catalyst solution is added to the admixture in the flask. The flask is immersed in a metal bath at 210° C., stirred at 200 RPM and held for 30 minutes. 13.5 grams (0.0703 moles) of postconsumer PET flake (St. Jude Polymer, Frackville, Pa.) is added and stirring is continued for one hour. This addition process is repeated hourly over an eight hour period until a total of 108 grams of postconsumer flake has been added. The temperature is raised to 280° C. and a vacuum (approximately 10 mm mercury) is applied to remove excess glycol. The monomeric and oligomeric BHET thus produced has an I.V. of 0.15.

(Step 2) 97.0 grams (0.50 moles) of virgin DMT, 62 grams (1.0 moles) of EG, and 63.5 grams (0.25 moles) of the BHET monomer/oligomer mix prepared in accordance with Step 1 (containing 75% postconsumer constituents) is added to a 500 milliliter round bottom flask. 1.08 milliliters of a zinc/EG catalyst solution containing a sufficient amount of zinc acetate dihydrate to provide 0.0058 gram of zinc metal per milliliter of catalyst solution, 1.20 milliliters of a cobalt/EG catalyst solution containing a sufficient amount of cobalt acetate tetrahydrate to provide 0.0048 gram of cobalt metal per milliliter of catalyst solution, 2.25 milliliters of an antimony/EG catalyst solution containing a sufficient amount of antimony trioxide to provide 0.01039 gm of antimony metal per milliliter of catalyst solution, and 0.58 milliliters of a phosphorous/EG catalyst solution containing a sufficient amount of phosphorous in the form of a mixed ester of phosphorous to provide 0.97 gram of phosphorous metal per milliliter of catalyst solution are added to the admixture in the flask. The flask is immersed in a metal bath at 200° C. stirred at 200 RPM and held for one hour. The temperature is increased to 210° C. and held for two hours. To initiate polycondensation, the temperature is increased to 280° C. and the pressure is reduced from atmospheric to 0.2 mm mercury over a period of 4 minutes. Stirring is reduced as viscosity increases until a minimum of 25 RPM is achieved. Polycondensation is continued for 75 minutes. The polymer is allowed to cool and then the same is removed from the flask and ground so as to pass through a 3 mm screen. The I.V. of the polymer thus produced is 0.62 and the polymer contains 2.16 mole % diethylene glycol. The polymer has an L color value of 85.41, an a color value of 0.15, and a b color value of 1.90. The polymer is subjected to solid state polymerization at 215° C. for 12 hours with samples taken periodically for the purpose of calculating a polymerization rate. The rate thus calculated is 0.029 I.V. units/hr. The final solid state I.V. is 0.76.

The results of the foregoing examples, including the color values, diethylene glycol concentration, I.V., and acetaldehyde (AA) generation, are presented below in tabulated form in Table I.

In accordance with Example 1, a poly(ethylene terephthalate) polymer is produced from postconsumer PET flake. The polymer is made by first depolymerizing a quantity of postconsumer PET flake in the presence of a transesterification reaction of DMT and EG. The postconsumer PET and the virgin DMT are present in quantities such that about 75% of the terephalate moieties in the reaction mixture are provided by the postconsumer PET and 25% of the terephthalate moieties are provided by the virgin DMT. After transesterification and depolymerization are complete, the reaction mixture is caused to undergo polycondensation. The 0.36 I.V. polymer thus produced was then cast, ground to a powder and one part by weight thereof was blended with 2 parts by weight % of a 0.36 I.V. virgin polyethylene terephthalate. The blend was subjected to solid state polycondensation to thereby produce a poly(ethylene terephthalate) polymer having an I.V. of 0.76 and containing 25 wt % postconsumer flake residue. The color, diethylene glycol level, acetaldehyde generation, and solid state polycondensation rate are equal to or better than the results achieved in connection with a virgin polymer prepared using a conventional zinc/antimony or manganese/antimony catalyst system, as described above in Examples 5 and 6, and as tabulated in Table I below.

In accordance with Example 2, the 0.36 I.V. polymer produced in accordance with Example 1 was fed into a transesterification mix of dimethyl terephthalate and ethylene glycol, depolymerized during the transesterification step, and repolymerized in the melt to produce the color, diethylene glycol, etc. described above and tabulated in Table 1. All of the measurements for the Example 2 polymer are equal to or better than the corresponding measurements for the virgin controls of Examples 5 and 6.

In accordance with Example 3, a poly(ethylene terephthalate) polyester is produced so as to contain at least 25% postconsumer PET residue. In accordance with this Example, floating impurities are not siphoned off and the polymer is not filtered. The postconsumer flake is clean flake sold by St. Jude Polymer of Frackville, Pa. The transesterification catalyst is manganese acetate. The color, diethylene glycol concentration, solid stating rate, and acetaldehyde generation are equal to or better than these same characteristics for the virgin poly(ethylene terephthalate) produced in accordance with Examples 5 and 6.

In accordance with Example 4, a polyester product containing 75 mole % postconsumer constituents is produced. The postconsumer flake is purchased from St. Jude Polymer. Manganese acetate is used as the transesterification catalyst. The properties for this polymer as described above and tabulated in Table 1 are all equal to or better than the corresponding properties of the control polymers produced in accordance with Examples 5 and 6.

In Example 7, the process is the same as that of Example 4, except that the transesterification catalyst is zinc acetate rather than manganese acetate. The properties of the polyester thus produced are all equal to or better than the properties of the control polymers of Examples 5 and 6.

In accordance with Example 8, the produced polymer is a copolymer of poly(ethylene terephthalate) and approximately 1.5 mole % of cyclohexanedimethanol. The polymer contains 0.25 mole % postconsumer polyester constituents. The catalyst employed is zinc acetate. The properties shown in Table I for this polymer are equal to or better than the properties for the control polymers of Examples 5 and 6.

In accordance with Example 9, a low molecular weight precursor polymer having an I.V. of 0.15 is prepared by reacting dimethyl terephthalate, ethylene glycol and a sufficient amount of St. Jude postconsumer flake to provide 75% of the terephthalte moieties in the batch. Zinc acetate is employed as the catalyst. This precursor polymer, containing 75 mole % postconsumer PET constituents, is then used as a feed material in a transesterification stage to produce a final polyester product containing 25 mole % postconsumer constituents. This final polymer is produced using additional catalyst in the form of zinc acetate, cobalt acetate, phosphorus (as Merpol A), and antimony oxide. The properties of this polymer are described above and are tabulated in Table I. These properties are equivalent to or better than the properties of the control polymer containing no postconsumer constituents as described in Examples 5 and 6.

The foregoing examples demonstrate that additional catalyst, toners, and inhibitors can be used in addition to what is contained in the postconsumer flake without adversely effecting the diethylene glycol concentration, polymer color, and acetaldehyde generation.

The significance of the present invention is that postconsumer PET materials are shown to be sufficiently soluble in a DMT/EG transesterification mixture so that a sufficient amount of previously used PET may be depolymerized and repolymerized to provide a polyester product containing up to 75% previously used constituents, having a useful I.V., and having properties permitting the polyester product to be used as a bottle polymer. Moreover, the polymerization process does not generate excessive amounts of diethylene glycol or enhance acetaldehyde generation and has acceptable color. As provided in accordance with the invention, postconsumer polymer can be cleaned by filtering or by siphoning or by skimming as necessary or can be produced directly from postconsumer flake. The excellent glycolysis conditions provided in accordance with the process of the invention is unexpected in that excessive diethylene glycol production and acetaldehyde generation do not occur. Moreover, it is unexpected that the coloration of the polyester product appears to be unaffected by the inclusion of up to even 75% postconsumer polyester therein.

TABLE 1

| Example No. | Composition | Mole % Deg | Color L | a | b | Solid State Rate I.V. Unt/H r | Solid State | AA (ppm) |
|---|---|---|---|---|---|---|---|---|
| 1 | Poly(ethylene terephthalate) with 25% postconsumer PET content | 2.44 | 83.0 0 | — 0.77 | 1.50 | 0.027 | 0.76 | 11.9 9 |
| 2 | Poly(ethylene terephthalate) with | 2.10 | 82.0 | — | 2.00 | 0.029 | 0.74 | 12.0 |

TABLE 1-continued

| Example No. | Composition | Mole % Deg | Color L | a | b | Solid State Rate I.V. Unt/H r | Solid State | AA (ppm) |
|---|---|---|---|---|---|---|---|---|
|  | 25% postconsumer PET content |  | 0 | 1.27 |  |  |  | 3 |
| 3 | Poly(ethylene terephthalate) with | 1.74 | 83.1 | — | 2.12 | 0.032 | 0.80 | 13.6 |
|  | 25% postconsumer PET content |  | 6 | 0.77 |  |  |  | 9 |
| 4 | Poly(ethylene terephthalate) with | 2.52 | 80.4 | — | 2.25 | 0.043 | 0.81 | 12.9 |
|  | 75% postconsumer PET content |  | 8 | 1.47 |  |  |  | 5 |
| 5 | Poly(ethylene terephthalate) with | 2.44 | 86.1 | — | 2.00 | 0.024 | 0.77 | 15.0 |
|  | 100% virgin DMT content for control |  | 0 | 0.40 |  |  |  | 4 |
| 6 | Poly(ethylene terephthalate) with | 0.99 | 81.6 | — | 0.01 | 0.023 | 0.78 | 16.1 |
|  | 100% virgin DMT content for control |  | 5 | 0.90 |  |  |  | 4 |
| 7 | Poly(ethylene terephthalate) with | 2.64 | 82.3 | — | 1.40 | 0.019 | 0.76 | 7.21 |
|  | 75% postconsumer PET content |  | 2 | 1.15 |  |  |  |  |
| 8 | Poly(98.5/1.5 ethylene/ | 1.58 | 83.9 | — | 0.34 | 0.028 | 0.75 | 9.52 |
|  | 1,4-cyclohexanedimethylene |  | 2 | 0.06 |  |  |  |  |
|  | terephthalate) with 25% |  |  |  |  |  |  |  |
|  | postconsumer PET content |  |  |  |  |  |  |  |
| 9 | Poly(ethylene terephthalate) with | 2.16 | 85.4 |  | 1.90 | 0.029 | 0.76 | 10.2 |
|  | 25% postconsumer PET content |  | 1 | 0.15 |  |  |  |  |

We claim:

1. A process for preparing a polyester product from a polyester material to be recycled comprising:
   preparing a first reaction mixture including (1) a polyester material to be recycled, (2) a diol and (3) a first dicarboxylic or dicarboxylate species effective for transesterification with said diol to produce a second diester species which is effective for polycondensation to produce a polyester product;
   subjecting said first reaction mixture to conditions effective for causing transesterification of said diol and said first species to thereby produce said second species and simultaneously causing depolymerization of said polyester material to be recycled to thereby produce a regenerated species which is also effective for polycondensation to produce a polyester product, whereby to produce a second reaction mixture which contains both said second species and said regenerated species; and
   subjecting said second reaction mixture to conditions effective for causing polycondensation of said second species and said regenerated species, whereby to produce a new polyester product which contains units of both said second species and said regenerated species; and
   recovering said new polyester product from said reaction mixture.

2. A process as set forth in claim 1, wherein said polyester product and said polyester material each comprises a poly(ethylene terephthalate) material.

3. A process as set forth in claim 1, wherein said diol comprises ethylene glycol.

4. A process as set forth in claim 1, wherein said first species comprises dimethyl terephthalate.

5. A process as set forth in claim 1, wherein said regenerated species comprises either monomeric or oligomeric bis-(2-hydroxyethyl) terephthalate or a mixture of monomeric and oligomeric bis-(2-hydroxyethyl) terephthalates.

6. A process as set forth in claim 4, wherein said second species comprises either monomeric or oligomeric bis-(2-hydroxyethyl) terephthalate or a mixture of monomeric and oligomeric bis-(2-hydroxyethyl) terephthalates.

7. A process as set forth in claim 1, wherein said first species comprises dimethyl terephthalate and said regenerated species comprises either monomeric or oligomeric bis-(2-hydroxyethyl) terephthalate or a mixture of monomeric and oligomeric bis-(2-hydroxyethyl) terephthalates.

8. A process as set forth in claim 1, wherein said polyester product and said polyester material each comprises a poly(ethylene terephthalate) material, said diol comprises ethylene glycol and said first species comprises dimethyl terephthalate.

9. A process as set forth in claim 1, wherein said polyester product is admixed with a virgin polyester product and further processed to produce a blended polyester product.

10. A process as set forth in claim 1, wherein said polyester product is reintroduced into a transesterification stage containing further quantities of said diol and said first species and subjected to further depolymerization while said further quantities of said diol and said first species simultaneously undergo transesterification.

11. A process as set forth in claim 1, wherein is included the step of using said polyester product for forming carbonated beverage containers.

12. A process as set forth in claim 1, wherein said polyester product includes polyester molecules made up of a series of terephthalate moieties, about 25 to about 75 molar % of said terephthalate moieties originating in said regenerated species and from about 75 to about 25 molar % of said terephthalate moieties originating in said first species.

13. A process as set forth in claim 1, wherein said first and second reaction mixtures are reacted in separate, respective reactors.

14. A process as set forth in claim 8, wherein said first new polyester product contains both ethylene glycol and 1,4-cyclohexanedimethanol diol units, said 1,4-cyclohexanedimethanol units comprising up to about 5 molar % of the total of said diol units, said 1,4-cyclohexanedimethanol units originating either as a part of said diol in said first reaction mixture or as a part of said polyester material to be recycled.

15. A process as set forth in claim 8, wherein said new polyester product contains both isophthalic and terephthalic acid units, said isophthalic units comprising up to about 5 molar % of the total of said acid units, said isophthalic units originating either as a part of said first species in said first reaction mixture or as a part of said polyester material to be recycled.

16. A process as set forth in claim 8, wherein said new polyester product contains both 2,6-napthalenedicarboxylic and terephthalic acid units, said 2,6-napthalenedicarboxylic units comprising up to about 5 molar % of the total of said acid units, said 2,6-napthalenedicarboxylic units originating either as a part of said first species in said first reaction mixture or as a part of said polyester material to be recycled.

17. A process for preparing a new polyester product from up to 75 molar % postconsumer poly(ethylene terephthalate) flake material to be recycled and consisting essentially of ground used soft drink bottle polyester material, said process comprising:

preparing a first reaction mixture including (1) said postconsumer poly(ethylene terephthalate) flake material, (2) an ethylene glycol component and (3) a dimethyl terephthalate component;

subjecting said first reaction mixture to conditions effective for causing transesterification of said ethylene glycol component and said dimethyl terephthalate component to thereby produce a first species comprising either monomeric or oligomeric bis-(2-hydroxyethyl) terephthalate or a mixture of monomeric and oligomeric bis-(2-hydroxyethyl) terephthalates and simultaneously causing depolymerization of said postconsumer poly(ethylene terephthalate) flake material to thereby produce a regenerated species also comprising either monomeric or oligomeric bis-(2-hydroxyethyl) terephthalate or a mixture of monomeric and oligomeric bis-(2-hydroxyethyl) terephthalates, whereby to produce a second reaction mixture containing both said first species and said regenerated species;

subjecting said second reaction mixture to conditions effective for causing polycondensation of said first species and said regenerated species, whereby to produce a new polyester product which contains terephthalate units of both said first species and said regenerated species, the relative quantities of said postconsumer poly(ethylene terephthalate) flake material and said dimethyl terephthalate component charged as reactants into said process being such that the total of said terephthalate units in said new polyester product comprises from about 25 to about 75 molar % of units of said regenerated species and from about 75 to about 25 molar % of units of said first species; and recovering said new polyester product from said second reaction mixture.

18. A process as set forth in claim 17, wherein said new polyester product contains both isophthalic and terephthalic acid units, said isophthalic units comprising up to about 5 molar % of the total of said acid units, said isophthalic units originating either as a part of said dimethyl terephthalate component in said first reaction mixture or as a part of said postconsumer poly(ethylene terephthalate) flake material.

19. A process as set forth in claim 17, wherein said new polyester product contains both 2,6-napthalenedicarboxylic and terephthalic acid units, said 2,6-napthalenedicarboxylic units comprising up to about 5 molar % of the total of said acid units, said 2,6-napthalenedicarboxylic units originating either as a part of said dimethyl terephthalate component in said first reaction mixture or as a part of said postconsumer poly(ethylene terephthalate) flake material.

20. A process as set forth in claim 17, wherein said first new polyester product contains both ethylene glycol and 1,4-cyclohexanedimethanol diol units, said 1,4-cyclohexanedimethanol units comprising up to about 5 molar % of the total of said diol units, said 1,4-cyclohexanedimethanol units originating either as a part of said ethylene glycol component in said first reaction mixture or as a part of said postconsumer poly(ethylene terephthalate) flake material.

* * * * *